UNITED STATES PATENT OFFICE.

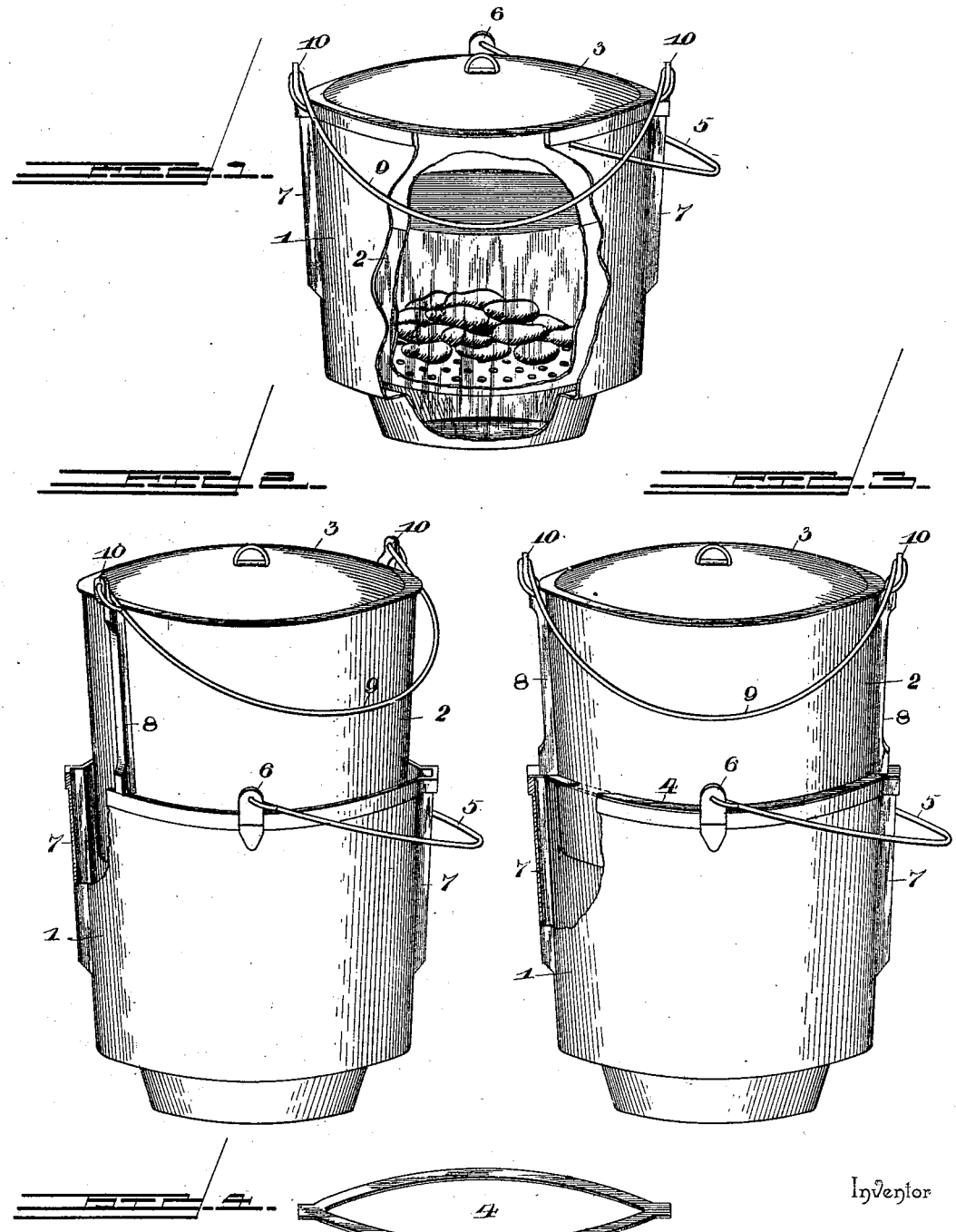

HODEVAH HENRY ERLAM, OF DIGBY, CANADA.

COOKING UTENSIL.

SPECIFICATION forming part of Letters Patent No. 554,996, dated February 18, 1896.

Application filed November 22, 1895. Serial No. 569,833. (No model.) Patented in Canada June 26, 1893, No. 43,352.

*To all whom it may concern:*

Be it known that I, HODEVAH HENRY ERLAM, a citizen of the United States, residing at Digby, in the county of Digby, Province of Nova Scotia, and Dominion of Canada, have invented a new and useful Cooking Utensil, (patented in Canada June 26, 1893, No. 43,352,) of which the following is a specification.

The purpose of this invention is to provide a pot or cooking utensil which will admit of the hot water being drained off without danger of scalding the hands or arms by either steam or hot water, and which will prevent burning of the food and at the same time admit of the food being cooked quickly.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view showing the device used as a cooker, parts being broken away. Fig. 2 shows the device as arranged for draining and having a portion of the pot broken away. Fig. 3 shows the device assembled for steaming, parts being broken away. Fig. 4 is a detail view of the ring interposed between the pot and the food-receptacle.

The same reference-numerals denote corresponding and like parts in all the figures of the drawings, and in the latter—

1 indicates the pot; 2, the food-receptacle; 3, the cover for either the pot or the food-receptacle, and 4 the ring for closing the space between the pot and the food-receptacle when the device is used as a steamer.

The pot 1 may be of any desired size and form, and its bottom may be depressed to fit into a stove-hole or may be flat or slightly rounding, or have any form usually given to cooking utensils. The bail 5 is secured to ears 6 in the ordinary manner, said ears projecting from the sides of the pot a sufficient distance to afford clearance to the cover 3 and the food-receptacle when placing the latter within the pot. Vertical channels or grooves 7 are formed in the sides of the pot at diametrically-opposite points and extend about two-thirds the length of the pot, and are intended to receive vertical ribs 8 at the sides of the food-receptacle, so as to guide the latter in its movements when placing it within or removing it from the pot, and these ribs engage with the lower closed ends of the vertical channels or grooves 7 and support the bottom of the food-receptacle a proper distance above the bottom of the pot, so as to prevent burning of the food during the cooking process.

The food-receptacle 2 is of such relative dimensions as to fit easily within the pot, and is provided at its sides with ribs 8 to correspond with and enter the channels or grooves 7, and these ribs are square at their lower ends and terminate a short distance from the bottom of the food-receptacle. The bottom of the food-receptacle is perforated to admit of the free passage of the water or fat contained in the pot, so that the food to be cooked may come in direct contact with the water or fat employed in the cooking operation.

When the device is used for steaming the perforations in the bottom of the food-receptacle permit the free passage of the steam into the food-receptacle in the ordinary way, as will be readily understood.

The bail 9 has connection with ears 10 provided at the upper ends of the ribs 8 and occupies a position exterior to the pot when the food-receptacle is located wholly therein.

When cooking food by frying the fat is placed in the pot and the food to be cooked is placed within the receptacle 2 and the latter lowered into the pot, and after the cooking operation the receptacle 2 is lifted until the lower ends of the ribs 8 clear the top of the pot, when the said receptacle is turned to bring the ribs out of register with the channels or grooves 7, and the said receptacle will be supported by engagement of the lower ends of the ribs 8 with the top edge of the pot, thereby permitting the food to thoroughly drain either of the fat or water employed for cooking the same. Advantage can be taken of this position of the food-receptacle to keep the food warm and in proper condition to be served.

The ring 4 is of a size to correspond with the top of the pot, and the opening therein corresponds with the lower portion of the food-receptacle, so as to form a close fit therewith and support the food-receptacle in the pot at a proper elevation for thorough and effective steaming, and this ring is formed at diametrically-opposite points with extensions 11 to project over the upper ends of the vertical channels or grooves 7 and close the same. This ring may be used with equal advantage for supporting the food-receptacle for purposes of draining, but it is not generally used in this way, as it is much easier and more convenient to support the food-receptacle by means of the ribs in the manner previously described.

A device of the character herein described is handy, provides a quick drainer, an efficient cooker and steamer, is durable and cheap, makes work lighter in the kitchen, and obviates burned fingers and scalded arms, and when constructed of a suitable size and material can be used for boiling clothes and various other articles generally required to be steamed or boiled.

Having thus described the invention, what is claimed as new is—

1. A cooking utensil comprising a pot having vertical channels or grooves in its sides extending for a short distance from the top edge, and a food-receptacle having vertically-disposed ribs at its sides corresponding in position with and adapted to enter the said channels or grooves of the pot to support the food-receptacle a proper distance above the bottom of the pot and adapted to engage with the top edge of the pot and support the food-receptacle above the same, substantially as set forth for the purpose described.

2. In combination, a pot having vertical channels or grooves at diametrically-opposite points, and a food-receptacle having vertical ribs to enter and operate in the said vertical channels or grooves and adapted to engage with the top edge of the pot to support the food-receptacle above the same, said ribs being formed with ears to which is attached the bail, substantially as and for the purpose set forth.

3. In combination, a pot having vertical channels or grooves in its sides, a food-receptacle having ribs at its sides to enter the said channels or grooves, and a ring supported upon the top edge of the pot and having extensions to close the upper ends of the said channels or grooves and adapted to support the food-receptacle, substantially as and for the purpose specified.

In testimony that I claim the foregoing as my own I have hereto affixed my signature in the presence of two witnesses.

HODEVAH HENRY ERLAM.

Witnesses:
WAYLAND VAN BLASCOM,
ROBERT GORDON MONROE.